(No Model.)
W. N. AMORY.
PNEUMATIC TIRE REPAIRING DEVICE.
No. 602,420. Patented Apr. 19, 1898.
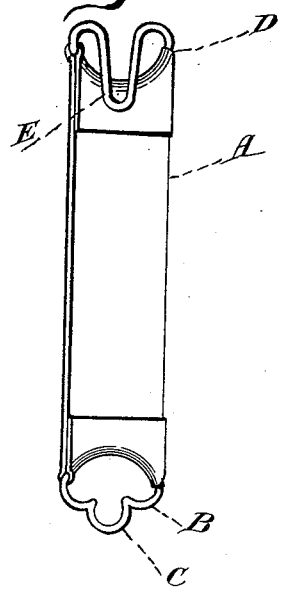
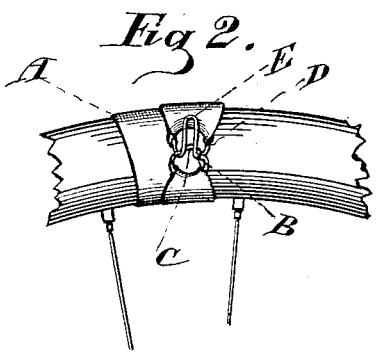
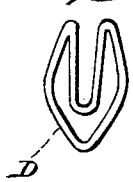
WITNESSES:
INVENTOR.
William N. Amory
By Dackt-Davis
ATTORNEY.

UNITED STATES PATENT OFFICE.

WILLIAM N. AMORY, OF NEW YORK, N. Y.

PNEUMATIC-TIRE-REPAIRING DEVICE.

SPECIFICATION forming part of Letters Patent No. 602,420, dated April 19, 1898.

Application filed June 19, 1896. Renewed March 10, 1898. Serial No. 673,401. (No model.)

*To all whom it may concern:*

Be it known that I, WILLIAM N. AMORY, a citizen of the United States, residing in the city and county of New York, in the State of New York, have invented a certain new and useful Improvement in Pneumatic-Tire-Repairing Devices, of which the following is a specification, such as will enable others skilled in the art to which it appertains to make and use the same.

The object of my invention is to provide a device of simple and cheap form of construction for use as a puncture-mending device for the pneumatic tires of bicycles, so that any punctures thereof may be instantaneously closed without the use of tools or sealing cements or fluids.

My invention consists of an elastic strap or band of suitable length provided with suitable catches or retaining devices at either end thereof, which are secured to the elastic strap in such manner that when the strap is wrapped tightly around the tire or other object and secured in place by the locking together of the catches or retaining devices greater tension will be upon the edges than upon the central portion of the strap, and the construction of such device is fully shown and described in the following specification, of which the accompanying drawings form a part, wherein—

Figure 1 is a view of such device unfastened. Fig. 2 is a view thereof in position upon the bicycle wheel and tire to mend a puncture thereof, and Fig. 3 is a view in detail of a modified form of the hook forming a part of the catch or fastening device thereof.

Referring to the drawings, A designates a band or strap of some highly-elastic material, preferably elastic gum-rubber, secured to one end of which is a ring or segment of a ring B, having an outer loop C, and at the other end of the strap A is secured a similar ring or segment of a ring D, provided with a backwardly-extending loop or hook E, adapted to hook into the loop C of the ring B and secure the strap A in place upon wheel and tire, as shown in Fig. 2.

The rings B and D are of the rounded shape shown and are secured to the strap A, as shown in Fig. 1, by passing the strap A through such ring or round portion of B and D, which rings or segments of rings are preferably of substantially the same diameter in the widest part as is the strap A in width, and then pulling upon the doubled portion of the strap A, so as to tighten and stretch the strap over the rings or segments of rings, so that the rubber will conform to the shape of the rings B and D, and then securing the doubled end of the rubber strap to the main or body portion thereof by vulcanizing, cementing, or in any other desired manner, and by this construction an extreme tension when the strap A is stretched to its fullest extent is brought upon the edges of the strap A, and by this the strap is made to hug and fit whatever object the same is placed around tightly across the entire width thereof, which would not be the case were it secured at the ends in any other manner, and in so bringing the greatest tension upon the edges rather than upon the center portion of the elastic strap A lies the main gist and greatest value of my invention. My invention therefore covers the use in this connection of any form of catch whereby the strap is more tightly stretched at the edges than at the middle, and I am not limited to the precise form shown.

While I prefer to have the portion of the catches B and D of the rounded form shown in Fig. 1, in some cases it may be preferable to make such portion thereof of the triangular shape shown at D' in Fig. 3.

The rounded portions of the B and D loop and hook are secured to the strap A in any desired manner, preferably by being firmly cemented thereto or vulcanized or cemented in a loop thereof in the well-known way.

To repair a puncture in a pneumatic tire, it is only necessary to lay the center portion of the strap A over the puncture and, tightly stretching the same, to wrap the strap twice around the tire and felly of the wheel and slip the hook E through the loop C, as shown in Fig. 2, when the natural elasticity of the band A will retain the same in place and close the puncture so tightly as to prevent the emission of air.

It is evident that many changes in the construction, combination, and arrangement of the various parts of said device may be made without departing from the scope of my invention, and I do not limit myself to the exact form shown; but, Having now particularly described and ascertained the nature of my said invention, what I claim, and desire to secure by Letters Patent, is—

1. As an article of manufacture, an elastic strap having fastening devices at its ends adapted to engage with each other and so fastened to said strap that, when it is stretched, a greater strain will be brought upon the edges of the strap than upon the middle thereof.

2. As an article of manufacture, an elastic strap provided at either end with interlocking fastenings, each of which is provided with a rounded portion to which the strap is secured so that when said strap is stretched a greater strain will be brought upon the edges than upon the middle thereof.

Signed in the city and county of New York, in the State of New York, this 16th day of June, A. D. 1896.

WILLIAM N. AMORY.

Witnesses:
JOSEPH P. O'NEILL,
LIZZIE C. MANNING.